United States Patent [19]
Adams et al.

[11] Patent Number: 5,619,334
[45] Date of Patent: Apr. 8, 1997

[54] CONTINUOUS-TONE PRINTER WITH EDGE ENHANCEMENT

[75] Inventors: Gregory K. Adams, Tomball; Ralph K. Williamson, Spring, both of Tex.

[73] Assignee: Compaq Computer Corporation, Houston, Tex.

[21] Appl. No.: 292,790

[22] Filed: Aug. 18, 1994

[51] Int. Cl.$^6$ .......................... H04N 1/40; H04N 1/409; H04N 1/46; H04N 1/58

[52] U.S. Cl. .......................... 358/298; 358/448; 358/530; 358/532

[58] Field of Search ...................... 358/298, 448, 358/455, 456, 458, 460, 465, 466, 530, 532–534; 382/237, 251, 254, 264, 266, 269, 270; 395/109, 112, 115, 131; 347/131, 184, 188, 232

[56] References Cited

U.S. PATENT DOCUMENTS

| | | |
|---|---|---|
| 5,041,848 | 8/1991 | Gilbert et al. .......................... 346/108 |
| 5,122,884 | 6/1992 | Gilbert et al. .......................... 358/298 |
| 5,193,008 | 3/1993 | Frazier et al. .......................... 358/298 |
| 5,212,559 | 5/1993 | Gilbert et al. .......................... 358/298 |
| 5,243,695 | 9/1993 | Russell et al. .......................... 395/143 |
| 5,287,209 | 2/1994 | Hiratsuka et al. ...................... 395/109 |
| 5,359,433 | 10/1994 | Nagase et al. .......................... 358/466 |
| 5,387,985 | 2/1995 | Loce et al. .......................... 358/455 X |

*Primary Examiner*—Eric Frahm
*Attorney, Agent, or Firm*—Vinson & Elkins L.L.P.

[57] ABSTRACT

A continuous-tone printer includes print enhancement circuitry for producing smooth edges responsive to continuous-tone pixel data. Translation circuitry translates the continuous-tone data into single-tone data responsive to a predetermined threshold. The single-tone data is stored in a memory coupled to edge enhancement circuitry, which may be similar to that used in prior enhancement circuits. For a given pixel, either the enhanced pixel data from the edge enhancement circuit or the continuous-tone data may be passed to print edges, based on the value of the continuous-tone pixel relative to upper and lower quantization values.

21 Claims, 3 Drawing Sheets

CONTINUOUS-TONE PRINTER WITH EDGE ENHANCEMENT

TECHNICAL FIELD OF THE INVENTION

This invention relates in general to computer printing devices, and more particularly to a continuous-tone printer with edge enhancing features.

BACKGROUND OF THE INVENTION

Continuous-tone printers use multiple bits to represent each pixel to be printed on a page. The multiple bits may represent the intensity or size of the pixel to be printed. An example of a continuous-tone printer is a color laser printer, in which the image to be printed is represented by multiple color planes, each color plane comprised of an array of multiple-bit pixels. In a color laser printer, four color planes are typically used: Cyan, Magenta, Yellow and Black. This type of printer is typically referred to as a CMYK printer. For "true color" representation, each color plane uses eight bits to represent each of its pixels, thereby providing 256 possible values. The pixels of each component color are combined on the print medium to form a dot. Thus, each dot has corresponding values in each of the four planes which determine the color of the dot.

In a color laser printer, the print engine prints each plane to the paper in successive passes. Hence, in a CMYK color laser printer, four passes must be made to produce the final output. Other color printers, such as color ink jet printers or thermal die transfer printers, may print four colors simultaneously.

Graphics produced by relatively low resolution (about 300 dpi) continuous-tone printers are of generally good quality. However, text, line art, and other high contrast edges result in "jaggies" which are easily discernable by the human eye. In traditional single-tone printers (i.e., black and white), edge enhancement techniques are applied to improve the qualities of edges to provide a smoother appearance. An example of edge enhancement is provided in FIGS. 1a and 1b. In FIG. 1a, a non-enhanced edge is shown. In FIG. 1b, the edge is enhanced using a first technique which alters the position of certain pixels to provide a smoother edge. In FIG. 1a, a sloping line is represented by dots 10a–e. In FIG. 1b, dots 10b and 10d have been horizontally displaced to provide a smoother line.

Edge enhancement in single-tone printers is performed by buffering several scan lines and viewing a set of dots surrounding the dot to be printed to identify patterns which present situations where an edge can be corrected for a smoother appearance. While there are several techniques for generating the enhanced edge, the predominate method of identifying edges is based on pattern-matching techniques.

A general block diagram of an edge enhancement circuit is shown in FIG. 2. A bitmap memory 12 stores a "1" or a "0" for each dot to be printed for an entire page. The data is read by serial interface circuit 14, which outputs serialized data. Without edge enhancement circuitry, the serialized data would be output directly to the print engine 16 which would modulate the laser (assuming the printer is a laser printer) responsive to the serialized data. Using edge enhancement, the serial interface directs image data to a buffer which stores the image pattern for a predetermined number of scan lines. Typically, the buffer memory 20 stores the data for five scan lines. The edge enhancement circuit 18 looks at a window of data in the buffer. As shown in FIG. 3, a seven-dot (shown as columns) by five scan line (shown as rows) window 22 in the buffer surrounds the current dot-to-be-printed 24 (note that dots outside the window in the fifth line are not used in the edge enhancement process and need not be stored in the buffer 20). Using combinational logic or other circuitry (such as a look-up table), the edge enhancement circuit 18 decides whether to process the dot normally or, if a recognized pattern is in the window 22, to modify the dot characteristics to be printed to paper by the print engine 16.

In a single-tone printer, edge enhancement can be performed by detecting patterns in the 5×7 array (or other array size, as appropriate). Since the laser in a laser printer scans across the drum at a constant speed, pattern detection must be done on-the-fly, in order to properly modulate the laser. Therefore, existing single-tone pattern recognition techniques cannot be performed adequately on a continuous-tone printer which would require an array of 5×7×8 bits, for each color plane. In this case, the possible combinations which could be handled by edge enhancements would be too great to perform given the time constraints. Further, the hardware resources for edge enhancement would be greatly increased.

Therefore, a need has arisen in the industry for edge enhancement techniques which may be used in conjunction with continuous-tone printers.

SUMMARY OF THE INVENTION

In the present invention, edge enhancement is provided in a continuous-tone printer by generating single-tone data from the continuous-tone data received by the printer. A first memory stores the single-tone data and a second memory stores the corresponding continuous-tone data. Edge enhancement circuitry recognizes patterns in the single-tone data relative to a current pixel and generates modified single-tone pixel data responsive thereto. Either the modified single-tone pixel data or corresponding continuous-tone data is passed to the print engine responsive to the continuous-tone data associated with the pixel to be printed.

The present invention provides significant advantages over the prior art. First, it allows for on-the-fly generation of edge enhancement data in continuous-tone printing. Second, it may be easily adapted with prior edge enhancement circuits which work on single-tone data.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 4–8 of the drawings, like numerals being used for like and corresponding parts of the various drawings.

Figure 4:
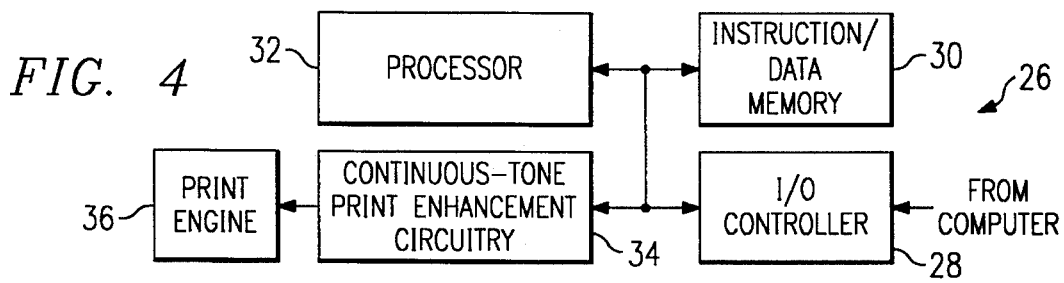
FIG. 4 illustrates a block diagram of the continuous-tone printer of the present invention.

FIG. 4 illustrates a block diagram of a continuous-tone printer using the preferred embodiment of the continuous-tone print enhancement techniques described herein. Unless otherwise noted, the detailed description applies to a 4-color continuous-tone laser printer, using an 8-bit representation for each pixel. In the illustrated embodiment, each dot is comprised of four pixels, representing the four constituent colors of each dot. Printer 26 receives print information from an attached computer (not shown) through an input/output controller 28. Pixel data for the four color planes and instructions are stored in an instruction/data memory 30. The instruction/data memory may comprise separate memories for instructions and data or may store both instructions and data in a single memory. A processor 32 controls operation of the printer 26 responsive to instructions in the instruction/data memory 30. A continuous-tone print enhancement circuit 34 receives data to be printed and optionally adjusts the size and/or location of pixels to provide smoother edges. Data from the continuous-tone print enhancement circuitry 34 is received by the print engine 36 which produces an image on a print medium, such as paper or transparencies.

The I/O controller 28, instruction/data memory 30 and processor 32 are similar to conventional single-tone laser printers, except that the data to be printed is stored as four separate planes, one plane for each CYMK color, and the image is produced by separately printing each color plane to the print medium in four successive passes.

Figure 5:
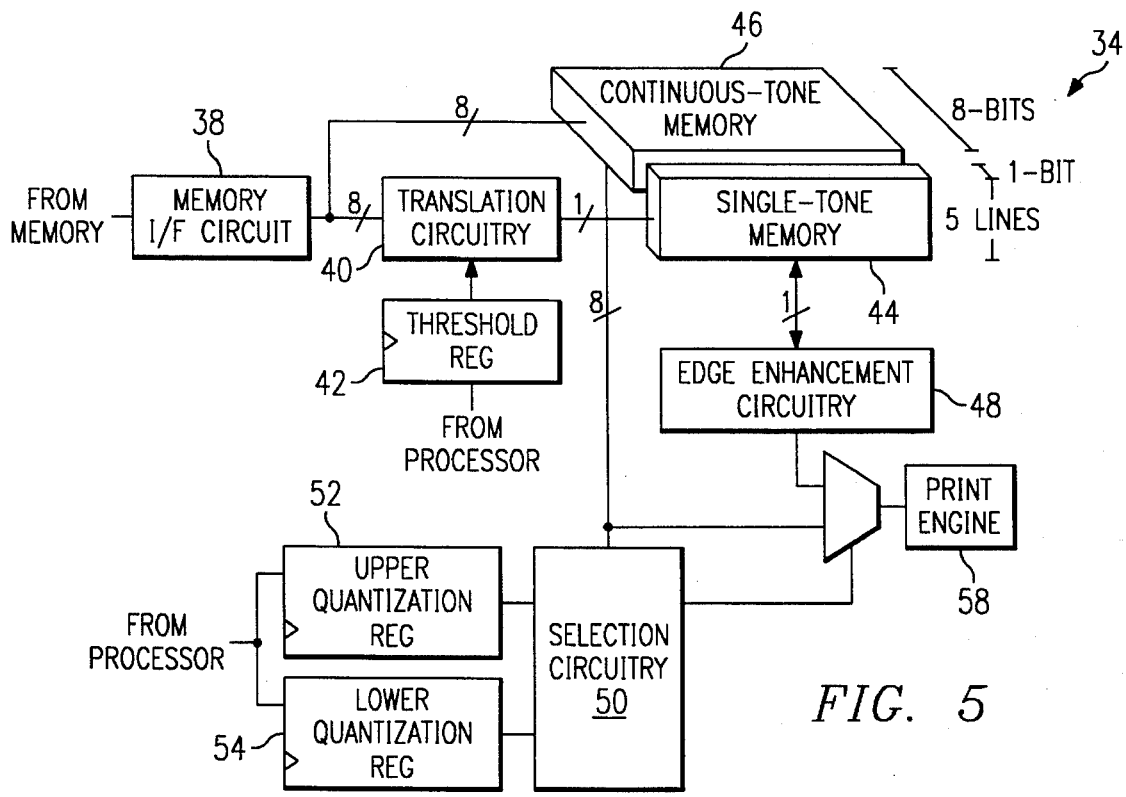
FIG. 5 illustrates a block diagram of the edge enhancement circuitry in the printer of FIG. 4.

FIG. 5 illustrates a block diagram of the continuous-tone print enhancement circuitry 34. A memory interface circuit 38 is coupled to translation circuitry 40, along with the threshold register (or other memory device) 42. A single-tone memory 44 receives the output of the translation circuitry 40 and a continuous-tone memory 46 receives the output from the memory interface circuit 38. Edge enhancement circuitry 48 is coupled to the single-tone memory 44. Selection circuitry 50 is coupled to upper quantization register 52 and lower quantization register 54 and to the continuous-tone memory 46. The output of the continuous-tone memory 46 and the output of edge enhancement circuitry 48 are coupled to multiplexer 56 which is controlled by an output of selection circuitry 50. The output of multiplexer 56 is coupled to the print engine 58.

In operation, the memory interface circuit transfers image data from the instruction/data memory 30 to the translation circuitry 40 and the continuous-tone memory 46. The image data is transferred one color plane at a time. The translation circuitry 40 receives pixel values output from the memory interface circuit 38 and translates the data associated with each pixel to either a "1" (logical high voltage) or a "0" (logical low voltage), depending upon whether or not it is greater than the value stored in the threshold register 42. In the preferred embodiment, the value stored in the threshold register 42 is programmable by the user (under control of processor 32), and may vary depending upon the color plane being accessed; i.e., separate thresholds may exist for each of the CMYK color planes. As a default, the threshold register is set at the 50% point (127 for 8-bit true color). Consequently, pixels having a value greater than 127 will be set to a "1" and pixels having a value less than or equal to 127 will be set to a "0".

The output of the translation circuitry 40 is stored in the single-tone memory 44 which holds the pixel data for five scan lines. The continuous-tone plane memory 46 holds the continuous-tone pixel values (8-bits) from the memory 30 corresponding to the single-tone data in single-tone memory 44. As discussed in greater detail hereinbelow, the continuous-tone plane memory 46 does not need to store a full five lines of continuous-tone pixel values; in the preferred embodiment, it stores continuous-tone pixels up to the current pixel-to-be-printed (see FIG. 3). Thus, for a 5 row ×7 pixel window, the continuous-tone memory 46 would store the most recent two lines plus four pixels from the third line. The single-tone memory 44 and continuous-tone plane memory 46 act as first-in, first-out memories.

Figure 1A:
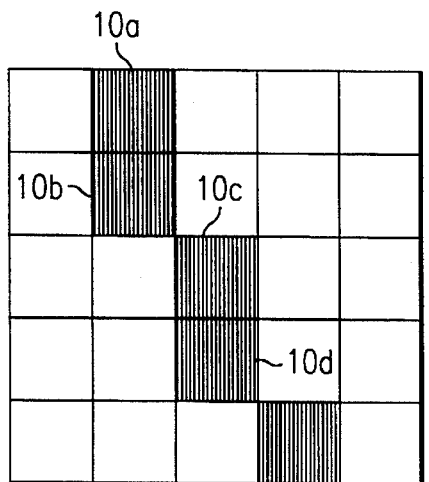
FIG. 1a illustrates a partial line segment using non-enhanced printing.
Figure 1B:
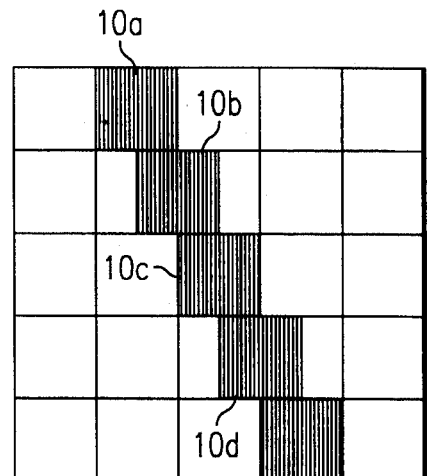
FIG. 1b illustrates a line drawn responsive to the pixel data of FIG. 1a, using prior art edge enhancement techniques.
Figure 2:
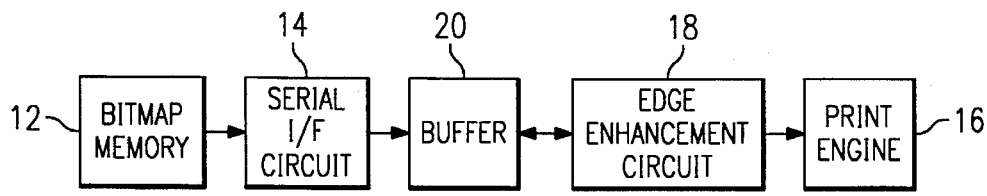
FIG. 2 illustrates a prior art enhancement circuit.
Figure 3:
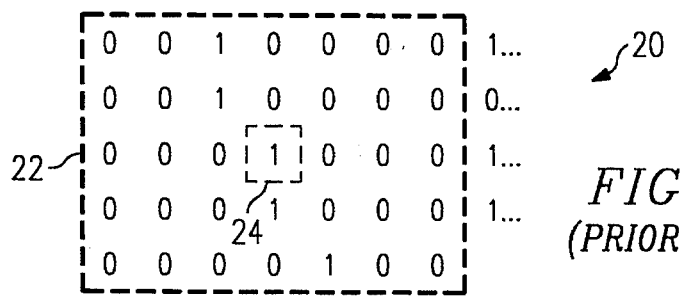
FIG. 3 illustrates a representation of pattern recognition using the prior art circuit of FIG. 2.

The edge enhancement circuitry 48 accesses the single-tone memory 44 as described in connection with FIGS. 2 and 3 hereinabove. Since the data in single-tone memory 44 has been translated to single bit data, representing whether the pixel value is greater than or less than the threshold, the edge enhancement circuitry 48 recognizes patterns in a two-dimensional, single-bit array, as in prior systems. For each pixel to be printed, the edge enhancement circuitry 48 will either pass the single-tone pixel data unchanged to multiplexer 56 or will output modified pixel data to control either the position or size of the pixel to be printed. As the modified pixel data is output from the edge enhancement circuitry 48, the corresponding continuous-tone pixel data is output from the continuous-tone memory 46 to the multiplexer 56. The selection circuitry 50 determines whether the modified pixel data from the edge enhancement circuitry 48 or the continuous-tone plane memory 46 will be passed to the print engine 58. The selection circuitry 50 makes this determination by comparing the data from the continuous-tone plane memory 46 to data stored in the upper quantization register 52 and lower quantization register 54. If the value of the current pixel-to-be-printed (from continuous-tone memory 46) is greater than the value in the upper quantization register 52 or less than the value in the lower quantization register 54, then the selection circuitry 50 controls the multiplexer 56 to pass the data from the edge enhancement circuitry 48. Similarly, if the value of the current pixel-to-be-printed is within the range designated by the upper quantization register 52 and lower quantization register 54, then the selection circuitry 50 controls the multiplexer 56 to pass the data from the continuous-tone memory 46, i.e., the un-enhanced continuous-tone data is output to the print engine 58. In the preferred embodiment, the values stored in the upper quantization register 52 and lower quantization register 54 are user programmable (under control of processor 32) and may be set to different values for each color plane. As defaults, for a 8-bit continuous-tone printer, the lower and upper quantization points are set at "10" and "250", respectively. As is evident from the foregoing, continuous-tone pixel data after the current pixel-to-be-printed is not needed (since all edge enhancement is performed on the single-tone data) and, therefore, the continuous-tone memory 46 may be reduced to slightly over two lines, even though anti-aliasing is performed on a five line by seven pixel window.

Figure 6:
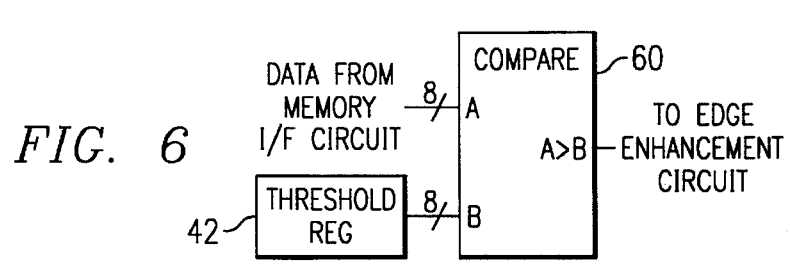
FIG. 6 illustrates a block diagram of the translation circuitry of FIG. 5.

FIG. 6 illustrates a block diagram of a preferred embodiment of the translation circuitry 40. Continuous-tone data from the memory interface circuit 38 is input to a compare circuit 60, along with data from the threshold register 42. The compare circuit 60 outputs a "1" if the continuous-tone pixel data from the memory interface circuit 8 is greater than the value stored in the threshold register 42. It should be noted that the translation circuitry for the 50% default could be accomplished by passing the most significant bit of the data from the memory interface circuit to the single-tone plane memory 44. In the preferred embodiment, the user has the option of whether or not to apply the print enhancement circuitry 34 to each color plane. In the block diagram of FIG. 6, this could be accomplished, for example, by loading the threshold register 42 with a value of "255" (for 8-bit pixel data) to disable edge enhancement.

Figure 7:
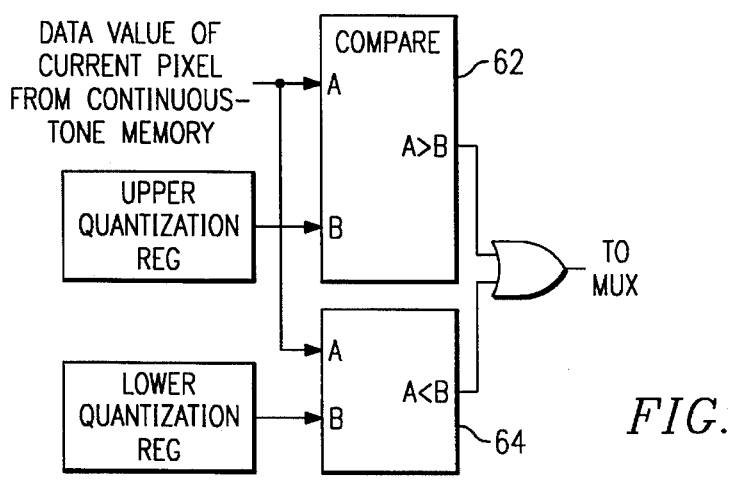
FIG. 7 illustrates a block diagram of the selection circuitry of FIG. 5.

FIG. 7 illustrates a block diagram of a preferred embodiment of the selection circuitry 50. In this embodiment, the data value of the current pixel from the continuous-tone plane memory 46 is input into compare circuits 62 and 64. The upper quantization register 52 is coupled to compare circuit 62 and the lower quantization register 54 is coupled to compare circuit 64. Compare circuit 62 outputs a "1" if the data value of the current continuous-tone pixel exceeds the value in the upper quantization register 52. Compare circuit 64 outputs a "1" if the data value of the current continuous-tone pixel is less than the value in the lower quantization register 54. The outputs of compare circuits 62 and 64 are coupled to OR gate 66. The output of OR gate 66 is coupled to the select port of multiplexer 56.

Figure 8:
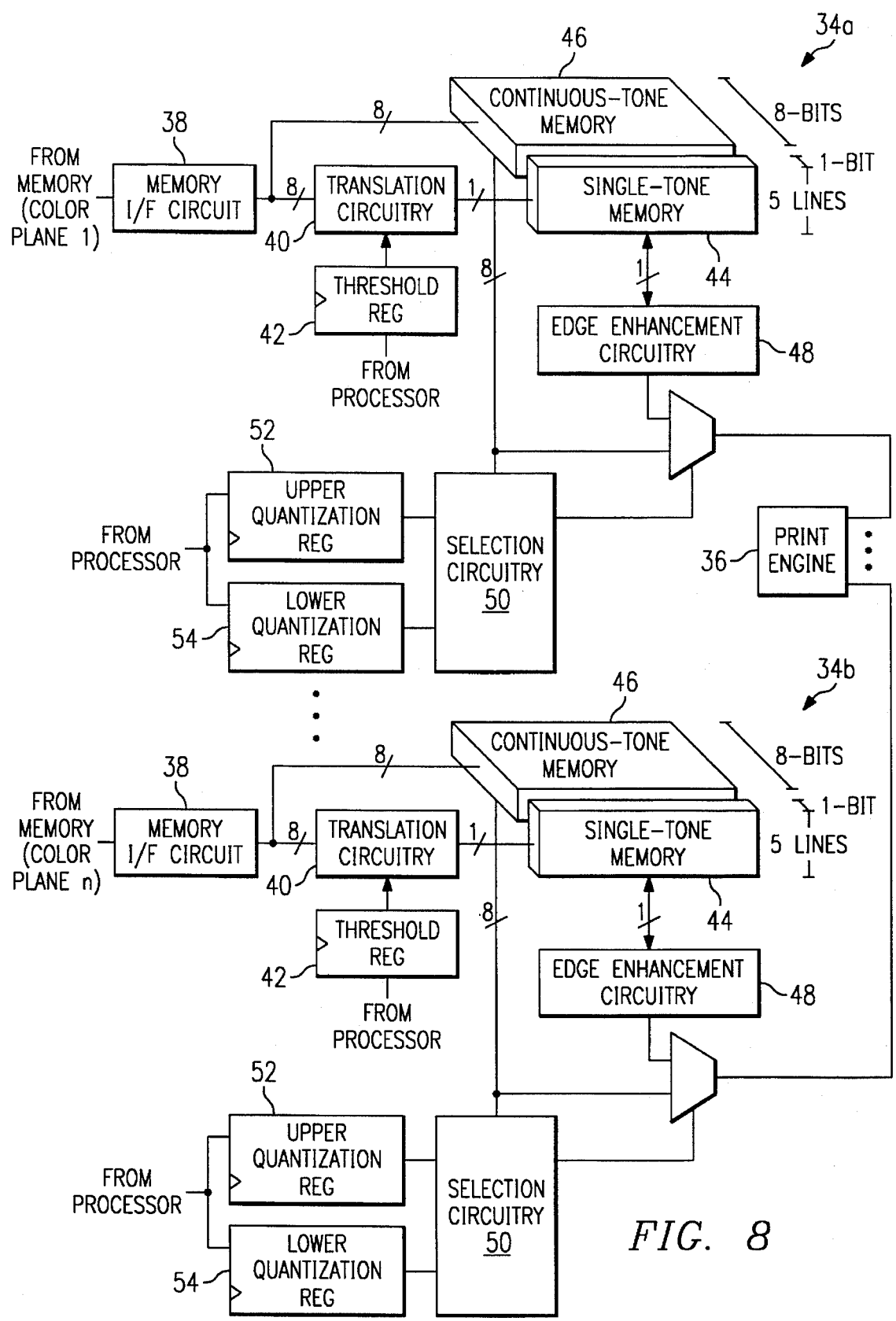
FIG. 8 illustrates a block diagram of an preferred embodiment for use with continuous-tone printers which print multiple color planes simultaneously.

FIG. 8 illustrates an embodiment of the present invention for use in connection with printers which perform multi-color printing by operating on multiple color planes simultaneously, such as color ink jet printers. As shown in FIG. 8, multiple print enhancement circuits 34 (designated individually as 34a and 34b) may be used to provide simultaneous enhancement on multiple color planes, with the outputs of the respective multiplexers 56 output to a print engine 36 for receiving multiple color data. Alternatively, print enhancement circuits may be provided for only certain of the colors of a multi-color printer. For example, it may be desirable to have a multi-color printer using the print enhancement circuit 34 only for the black color plane.

In the embodiment of FIG. 8, it should be noted that each of the registers 42, 52 and 54 of the respective print enhancement circuits 34 may be individually programmed for each color plane.

The present invention provides significant advantages. First, it may be implemented in a continuous-tone printer without significantly increasing the circuitry relative to single-tone printers. Second, it may be easily adapted to existing architectures for continuous-tone and multi-color printers. Third, the operation of edge-enhancement does not encompass any speed degradation relative to single-tone print enhancements circuits. Fourth, the continuous-tone memory of edge enhancement circuitry can store roughly half the number of pixels as needed for the single-tone anti-aliasing, thereby reducing memory requirements, particularly when the edge enhancement circuitry is to be implemented as part of an ASIC (application specific integrated circuit).

Although the present invention and its advantages have been described in detail, it should be understood that various changes, substitutions and alterations can be made herein without departing from the spirit and scope of the invention as defined by the appended claims.

What is claimed is:

1. Circuitry for providing edge enhancement in a printer from continuous-tone data representing pixels to be printed, comprising:

circuitry for generating single-tone data from the continuous-tone data;

a first memory for storing single-tone data;

a second memory for storing continuous-tone values corresponding to the single-tone values stored in said first memory;

edge enhancement circuitry for generating modified pixel data based on the data stored in said first memory; and circuitry for selecting either the modified single-tone pixel data or corresponding continuous-tone data for a current pixel.

2. The circuitry of claim 1 wherein said circuitry for generating single-tone data comprises a compare circuit for generating a logical voltage responsive to a comparison between the value of the continuous-tone data relative to a threshold.

3. The circuitry of claim 2 and further comprising circuitry for programmably setting said threshold.

4. The circuitry of claim 3 wherein said circuitry for programmably setting said threshold comprises circuitry for setting different thresholds for multiple color planes.

5. The circuitry of claim 1 wherein said selecting circuitry comprises circuitry for selecting either the modified single-tone pixel data or corresponding continuous-tone data responsive to a comparison of the value of the current pixel relative to upper and lower thresholds.

6. The circuitry of claim 5 wherein said selecting circuitry comprises circuitry for selecting either the modified single-tone pixel data or corresponding continuous-tone data responsive to whether the current pixel has a value between upper and lower thresholds.

7. The circuitry of claim 1 wherein said edge enhancement circuitry comprises circuitry for recognizing patterns in said single-tone data in said first memory relative to a current pixel and generating modified single-tone pixel data responsive thereto.

8. A printer comprising:

a print engine;

a controller;

storage circuitry coupled to said controller for storing continuous-tone pixel data from a computer; and print enhancement circuitry coupled to said print engine comprising:

circuitry for generating single-tone data from the continuous-tone data;

a first memory for storing single-tone data;

a second memory for storing continuous-tone values corresponding to the single-tone values stored in said first memory;

edge enhancement circuitry for generating modified pixel data based on the data stored in said first memory; and circuitry for selecting either the modified single-tone pixel data or corresponding continuous-tone data for a current pixel.

9. The circuitry of claim 8 wherein said circuitry for generating single tone data comprises a compare circuit for generating a logical voltage responsive to a comparison between the value of the continuous-tone data relative to a threshold.

10. The circuitry of claim 9 and further comprising circuitry for programmably setting said threshold.

11. The circuitry of claim 10 wherein said circuitry for programmably setting said threshold comprises circuitry for setting different thresholds for multiple color planes.

12. The circuitry of claim 8 wherein said selecting circuitry comprises circuitry for selecting either the modified single-tone pixel data or corresponding continuous-tone data responsive to a comparison of the current pixel relative to upper and lower thresholds.

13. The circuitry of claim 12 wherein said passing circuitry comprises circuitry for passing a either the modified single-tone pixel data or corresponding continuous-tone data responsive to the current pixel having a value between upper and lower thresholds.

14. The circuitry of claim 1 wherein said edge enhancement circuitry comprises circuitry for recognizing patterns in said single-tone data in said first memory relative to a current pixel and generating modified single-tone pixel data responsive thereto.

15. A method of performing edge enhancement in a printer for printing an image responsive to continuous-tone pixel data comprising the steps of:

generating single-tone data from the continuous-tone pixel data;

storing the single-tone data in a first memory;

storing continuous tone data corresponding to the single-tone data in a second memory;

performing edge enhancement to generate modified pixel data based on the single-tone data in said first memory; and selecting either the modified pixel data or the continuous-tone data responsive to the value of a current pixel.

16. The method of claim 15 wherein said step of generating single tone data comprises generating a logical voltage responsive to a comparison between the value of the continuous-tone data relative to a threshold.

17. The method of claim 16 and further comprising the step of programmably setting said threshold.

18. The method of claim 17 wherein said step of programmably setting said threshold comprises setting different thresholds for multiple color planes.

19. The method of claim 15 wherein said selecting step comprises selecting either the modified single-tone pixel data or corresponding continuous-tone data responsive to a comparison of the value of the current pixel relative to upper and lower thresholds.

20. The method of claim 19 wherein said selecting step comprises selecting either the modified single-tone pixel data or corresponding continuous-tone data responsive to the current pixel having a value between upper and lower thresholds.

21. The method of claim 15 wherein said step of performing edge enhancement comprises recognizing patterns in said single-tone data in said first memory relative to a current pixel and generating modified single-tone pixel data responsive thereto.

* * * * *